(12) United States Patent
Bauer et al.

(10) Patent No.: US 7,482,398 B2
(45) Date of Patent: Jan. 27, 2009

(54) ELASTIC COVERING MATERIAL HAVING IMPROVED FLAME RETARDANT PROPERTIES AND PRODUCTION THEREOF

(75) Inventors: Harald Bauer, Kerpen (DE); Hans-Matthias Deger, Hofheim (DE); Werner Krause, Hürth (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 186 days.

(21) Appl. No.: 10/890,068

(22) Filed: Jul. 13, 2004

(65) Prior Publication Data

US 2005/0011401 A1 Jan. 20, 2005

(30) Foreign Application Priority Data

Jul. 14, 2003 (DE) ................. 103 31 888

(51) Int. Cl.
C08K 5/5313 (2006.01)
(52) U.S. Cl. .................... 524/126; 524/133; 524/914; 428/456
(58) Field of Classification Search ................ 524/126, 524/133, 914; 428/456
See application file for complete search history.

(56) References Cited

U.S. PATENT DOCUMENTS

| 1,905,827 | A | * | 4/1933 | Ellis | ........................... 422/104 |
| 2,412,303 | A | * | 12/1946 | Spitzli et al. | .................. 106/18 |
| 2,428,282 | A | * | 4/1947 | Kemmler | ................... 524/143 |
| 2,775,994 | A | * | 1/1957 | Rowe | ........................... 264/74 |
| 5,244,949 | A | * | 9/1993 | Wirth et al. | .................. 524/100 |
| 5,545,833 | A | * | 8/1996 | Stoddard | ................... 528/337 |
| 5,773,556 | A | * | 6/1998 | Kleiner et al. | ............... 528/321 |
| 6,207,736 | B1 | | 3/2001 | Nass et al. | |
| 6,365,071 | B1 | | 4/2002 | Jenewein et al. | |
| 6,372,878 | B1 | * | 4/2002 | Wernik et al. | ............... 528/141 |
| 6,420,459 | B1 | | 7/2002 | Horold | |
| 6,509,401 | B1 | | 1/2003 | Jewewein et al. | |
| 6,547,992 | B1 | | 4/2003 | Schlosser et al. | |
| 7,138,448 | B2 | * | 11/2006 | Kaprinidis et al. | .......... 524/101 |
| 2004/0146708 | A1 | | 7/2004 | Mauk et al. | |
| 2005/0048278 | A1 | * | 3/2005 | Reichwein et al. | ........... 428/331 |
| 2005/0142371 | A1 | * | 6/2005 | Swain et al. | ................. 428/516 |
| 2005/0234173 | A1 | * | 10/2005 | Tsuchikawa et al. | ........ 524/415 |

FOREIGN PATENT DOCUMENTS

| CA | 2470954 | 6/2003 |
| DE | 19614424 | 10/1997 |
| DE | 19734437 | 2/1999 |
| DE | 19737727 | 7/1999 |
| DE | 199 04 814 | * 8/1999 |
| DE | 19910389 | 9/2000 |
| EP | 1024167 | 8/2000 |
| EP | 1024168 | 8/2000 |
| GB | 418467 | 10/1934 |
| GB | 835693 | 5/1960 |
| GB | 2159184 | 11/1985 |
| WO | WO 96/16948 | 6/1996 |
| WO | WO 98/08898 | 3/1998 |
| WO | WO 98/39306 | 9/1998 |
| WO | WO 98/45364 | 10/1998 |
| WO | WO 02/081812 | 10/2002 |
| WO | WO 03/052196 | 6/2003 |

OTHER PUBLICATIONS

Brandprufung Nach DIN 4102 T14; "Radiant Floor Panel Test" May 1990.
EPO Search Report for EP 04015722, mailed Nov. 18, 1994.

* cited by examiner

*Primary Examiner*—Peter Szekely
(74) *Attorney, Agent, or Firm*—Anthony A. Bisulca

(57) ABSTRACT

The invention relates to an elastic covering material, which comprises, as a flame retardant, a phosphinate salt of the formula (I) and/or a diphosphinate salt of the formula (II) and/or polymers thereof

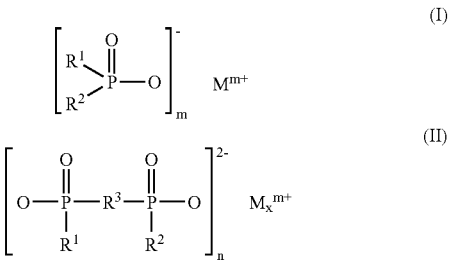

where
$R^1$, $R^2$ are the same or different and are each $C_1$-$C_6$-alkyl, linear or branched, and/or aryl;
$R^3$ is $C_1$-$C_{10}$-alkylene, linear or branched, $C_6$-$C_{10}$-arylene, -alkylarylene or -arylalkylene;
M is Mg, Ca, Al, Sb, Sn, Ge, Ti, Zn, Fe, Zr, Ce, Bi, Sr, Mn, Li, Na, K and/or a protonated nitrogen base;
m is from 1 to 4;
n is from 1 to 4;
x is from 1 to 4.

The invention relates to processes for producing such elastic covering materials.

24 Claims, No Drawings

ELASTIC COVERING MATERIAL HAVING IMPROVED FLAME RETARDANT PROPERTIES AND PRODUCTION THEREOF

The present invention is described in the German priority application No. 10331888.7, filed 14.07. 2003, which is hereby incorporated by reference as is fully disclosed herein.

The present invention relates to an elastic covering material having improved flame retardant properties and to a process for its production.

Elastic covering materials are used in various types of, above all, floorcoverings, of which a few are described hereinbelow.

Floorcoverings based on linoleum: floorcoverings based on linoleum and processes for their production have been known for some time. However, one disadvantage of the linoleum-based floorcoverings disclosed by the prior art is the not uncritical fire performance, since linoleum only achieves the B1 construction materials class with difficulties (fire testing to DIN 4102 T14, "Radiant Flooring Panel Test").

WO 02/081812 describes a linoleum-based floorcovering, comprising at least one wear layer of linoleum which comprises at least one flame retardant selected from the group of the expandable graphites.

Floorcoverings based on cork: the not uncritical fire performance is also a disadvantage of the prior art cork-based floorcoverings.

WO 02/081812 also describes a cork-based floorcovering, comprising at least one flame retardant selected from the group of the expandable graphites.

Owing to the low intrinsic brightness of graphite, it can either not be used in the wear layer as a flame retardant or the user has to accept a dark coloration of the material. This disadvantageous dark coloration, depending on the production process, may also occur as a Jaspé-like structure. Bright colorations are not possible without the excessive use of white pigments.

In addition, expandable graphites contain considerable proportions of intercalation compounds which ensure expansion in the event of fire. Frequently, these are sulfuric acid, acetic acid or nitric acid. The levels of these acids may be up to 8% by weight. When such expandable graphite is used in the polymer, a considerable proportion of acidic electrolyte can be washed out in a moist atmosphere or in the event of accumulated moisture. This may lead to considerable corrosion in the environment of the component, for example to concrete corrosion in the case of concrete and sulfuric acid and to copper corrosion in the case of electrical components.

In the event of fire, dangerous vapors such as acetic acid, sulfur dioxide, sulfur trioxide or nitrous gases may additionally be formed.

It is therefore an object of the present invention to provide a covering which avoids the aforementioned disadvantages of the prior art and which should have distinctly improved fire performance compared to the prior art. At the same time, the organophosphorus flame retardant used should have high whiteness and a low proportion of soluble electrolyte.

This object is achieved by an elastic covering material, which comprises, as a flame retardant, a phosphinate salt of the formula (I) and/or a diphosphinate salt of the formula (II) and/or polymers thereof

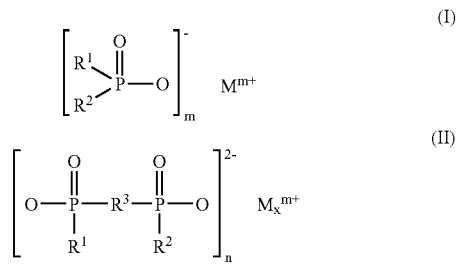

where
R$^1$, R$^2$ are the same or different and are each C$_1$-C$_6$-alkyl, linear or branched, and/or aryl;
R$^3$ is C$_1$-C$_{10}$-alkylene, linear or branched, C$_6$-C$_{10}$-arylene, -alkylarylene or -arylalkylene;
M is Mg, Ca, Al, Sb, Sn, Ge, Ti, Zn, Fe, Zr, Ce, Bi, Sr, Mn, Li, Na, K and/or a protonated nitrogen base;
m is from 1 to 4;
n is from 1 to 4;
x is from 1 to 4.
M is preferably calcium, aluminum or zinc.

The protonated nitrogen bases are preferably the protonated bases of ammonia, melamine, triethanolamine, especially NH$_4^+$.

R$^1$, R$^2$ are preferably the same or different and are each C$_1$-C$_6$-alkyl, linear or branched, and/or phenyl.

R$^1$, R$^2$ are more preferably the same or different and are each methyl, ethyl, n-propyl, isopropyl, n-butyl, tert-butyl, n-pentyl and/or phenyl.

R$^3$ is preferably methylene, ethylene, n-propylene, isopropylene, n-butylene, tert-butylene, n-pentylene, n-octylene or n-dodecylene.

R$^3$ is preferably also phenylene or naphthylene.

R$^3$ is preferably also methylphenylene, ethylphenylene, tert-butylphenylene, methylnaphthylene, ethylnaphthylene or tert-butylnaphthylene.

R$^3$ is preferably also phenylmethylene, phenylethylene, phenylpropylene or phenylbutylene.

The flame retardant preferably also comprises melamine phosphate, dimelamine phosphate, melamine pyrophosphate, melamine polyphosphates, melam polyphosphates, melem polyphosphates and/or melon polyphosphates.

The flame retardant preferably also comprises melamine condensates such as melam, melem and/or melon.

Suitable substances are condensates of melamine or reaction products of melamine with phosphoric acid or reaction products of condensates of melamine with phosphoric acid and also mixtures of the products mentioned. Condensates of melamine are, for example, melem, melam or melon, or more highly condensed compounds of this type and also mixtures thereof, and can be prepared, for example, by a process as described in WO 96/16948.

Reaction products with phosphoric acid refer to compounds which are formed by reaction of melamine or the condensed melamine compounds such as melam, melem or melon, etc., with phosphoric acid. Examples thereof are melamine polyphosphate, melam polyphosphate and melem polyphosphate or mixed polysalts, as described, for example, in WO 98/39306. The compounds mentioned are already known from the literature and can also be prepared by processes other than the direct reaction with phosphoric acid. Melamine polyphosphate can be prepared, for example, in a similar manner to WO 98/45364 by the reaction of polyphosphoric acid and melamine, or in a similar manner to WO 98/08898 by the condensation of melamine phosphate or melamine pyrophosphate.

The flame retardant preferably also comprises oligomeric esters of tris(hydroxyethyl)isocyanurate with aromatic polycarboxylic acids, benzoguanamine, tris(hydroxyethyl)isocyanurate, allantoin, glycoluril, melamine, melamine cyanurate, dicyandiamide and/or guanidine.

The flame retardant preferably comprises nitrogen-containing phosphates of the formulae $(NH_4)_yH_{3-y}PO_4$ or $(NH_4PO_3)_z$, where y is from 1 to 3 and z is from 1 to 10 000. The flame retardant preferably also comprises salts and esters of orthosilicic acid and condensates thereof, silicates, zeolites and silicas, glass powder, glass-ceramic powder or ceramic powder; magnesium hydroxide, hydrotalcite, magnesium carbonates or magnesium calcium carbonates; zinc oxide, zinc stannate, zinc hydroxystannate, zinc phosphate, zinc borate or zinc sulfide; aluminum hydroxide or aluminum phosphate.

The flame retardant preferably comprises nitrogen compounds.

The nitrogen compounds are preferably those of the formulae (III) to (VIII) or mixtures thereof

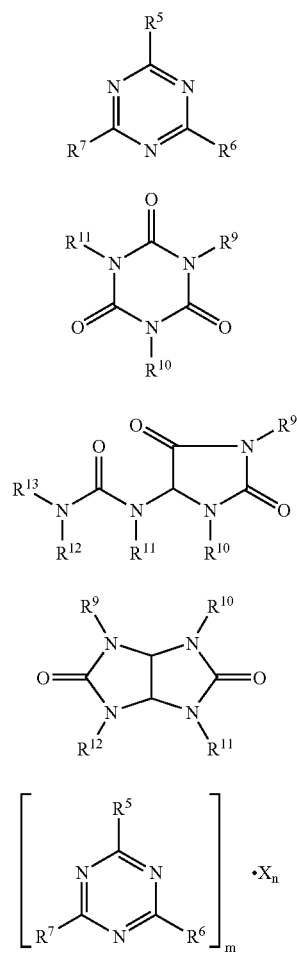

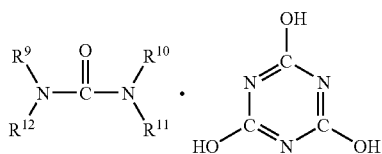

where
R$^5$ to R$^7$ are each hydrogen, $C_1$-$C_8$-alkyl, $C_5$-$C_{16}$-cycloalkyl or -alkylcycloalkyl, possibly substituted by a hydroxyl or a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, —OR$^8$ and —N(R$^8$)R$^9$, either N-alicyclic or N-aromatic, R$^8$ is hydrogen, $C_1$-$C_8$-alkyl, $C_5$-$C_{16}$-cycloalkyl or -alkylcycloalkyl, possibly substituted by a hydroxyl or a $C_1$-$C_4$-hydroxyalkyl function, $C_2$-$C_8$-alkenyl, $C_1$-$C_8$-alkoxy, -acyl, -acyloxy, or $C_6$-$C_{12}$-aryl or -arylalkyl, R$^9$ to R$^{13}$ are each the same groups as R$^8$ and also —O—R$^8$, m and n are each independently 1, 2, 3 or 4, X are acids which can form adducts with triazine compounds (III).

The flame retardant preferably also comprises carbodiimides.

Also in accordance with the invention are synergistic combinations of the phosphinates mentioned with the aforementioned nitrogen compounds, which function more effectively as flame retardants in a whole series of polymers than the phosphinates alone (DE-A-196 14 424, DE-A-197 34 437 and DE-A-197 37 727). The flame-retardant action of the surface-modified phosphinates may be improved by combination with further flame retardants, preferably nitrogen-containing synergists or phosphorus/nitrogen flame retardants.

The content of phosphinate salt of the formula (I) and/or a diphosphinate salt of the formula (II) and/or polymers thereof in the flame retardant is, according to the invention, from 1 to 99% by weight, preferably from 20 to 90% by weight and more preferably from 30 to 80% by weight.

The content of the flame retardant in the inventive flame-retarded elastic covering material is from 0.01 to 40% by weight, preferably from 0.1 to 20% by weight and more preferably from 0.3 to 10% by weight.

The elastic covering material is preferably linoleum, thermoplastics, polyvinyl chloride, combinations of unvulcanized and vulcanized rubber, cork, polymers based on polyurethane and/or styrene-butadiene latex.

When the covering material is linoleum, the covering material contains from 10 to 90% by weight of binders based on linoleum, from 10 to 90% by weight of organic fillers, from 5 to 40% by weight of inorganic (mineral) fillers and pigments, and from 0.1 to 10% by weight of flame retardants.

When the covering material is linoleum, the covering material preferably contains from 30 to 70% by weight of binders based on linoleum, from 30 to 70% by weight of organic fillers, from 5 to 35% by weight of inorganic (mineral) fillers and pigments, and from 0.1 to 10% by weight of flame retardants.

The thermoplastic is preferably polyvinyl chloride, acrylonitrile-butadiene-styrene, polypropylene, polyethylene, thermoplastic polyurethane, polyvinyl acetate, cellulose acetate, polystyrene, ethylcellulose, polyvinylidene chloride, polyurethane, nylon, acrylic, polyacrylate and/or polyphenylene oxide.

When the thermoplastic of the covering material is polyvinyl chloride, the covering material contains from 10 to 90% by weight of polyvinyl chloride, from 10 to 90% by weight of plasticizer, from 10 to 90% by weight of inorganic (mineral) fillers and from 0.1 to 10% by weight of flame retardants.

When the covering material is a combination of unvulcanized and vulcanized rubber, the covering material contains from 10 to 90% by weight of unvulcanized rubber, from 10 to 90% by weight of inorganic fillers and from 0.1 to 10% by weight of flame retardants.

When the covering material is cork, the covering material contains from 10 to 90% by weight of organic binder, from 10 to 90% by weight of organic fillers (cork granule) and from 0.1 to 10% by weight of flame retardants.

The organic binder is preferably melamine-formaldehyde resin.

When the elastic covering material can be used for backings of textile floorcoverings, it contains from 10 to 90% by weight of polymer composition from 10 to 90% by weight of inorganic (mineral) fillers from 0.1 to 10% by weight of flame retardants.

The invention also relates to a process for producing an elastic covering material using linoleum, which comprises melting semioxidized linseed oil with rosin at from 30 to 300° C. over from 0.01 to 100 h to give linoleum cement and then mixing the linoleum cement with organic and/or inorganic filler, pigments and flame retardants, subsequently granulating using a spiked roll (scraper) and compressing on a backing material using a calender at from 10 to 150° C. and then drying at from 30 to 300° C. over from 1 to 1000 h.

The invention also relates to a process for producing an elastic covering material based on PVC, which comprises mixing polyvinyl chloride, plasticizer, inorganic (mineral) fillers and flame retardants, and optionally further additives, rolling to form sheets and comminuting to a granule having particle sizes of from 0.1 to 10 mm which is melted at from 100 to 300° C. and rolled in a roller onto a support sheet and cut to size.

The invention also relates to a process for producing an elastic covering material based on unvulcanized rubber, which comprises mixing unvulcanized rubber, fillers, flame retardants and optionally further additives at from 100 to 300° C. over from 0.01 to 100 h and subsequently vulcanizing.

The invention also relates to a process for producing an elastic covering material based on cork, which comprises mixing organic binder and organic fillers (cork granule) having a particle size of from 0.1 to 10 mm with a crosslinking catalyst and then compressing with the flame retardant at elevated temperature of from 30 to 300° C. within from 0.01 to 100 hours and elevated pressure (1-200 t), and cutting the resulting blocks into slabs.

The invention also relates to a process for producing an elastic covering material for backings of textile floorcoverings, which comprises mixing polymer composition (latex), inorganic (mineral) fillers and the flame retardant at temperatures of from 20 to 300° C., and casting the resulting latex mixture on a carpet backing, and optionally applying a further top layer.

The preferred bulk density of the flame retardant is from 80 to 800 g/l, more preferably from 200 to 700 g/l.

The particle size of the flame retardant is preferably from 0.1 to 1000 μm, more preferably from 1 to 100 μm.

The whiteness of the flame retardant is preferably from 80 to 100 (Hunter L value), more preferably from 85 to 95.

According to the invention, the phosphorus content of the flame retardant is from 5 to 40%, more preferably from 15 to 30%.

The flowability of the flame retardant, determined with reference to DIN 53916 and expressed as the cotangent of the angle of repose phi, is preferably from 1 to 2, more preferably from 1.2 to 1.8.

The content of soluble electrolyte in the flame retardant, calculated as the anion (for example sulfate, acetate, nitrate, nitrite, bromide, chloride), is between 1 and 100 000 ppm, preferably between 10 and 50 000 ppm and more preferably between 20 and 1000 ppm.

According to the invention, the inventive flame-retarded elastic covering material may find use as a floorcovering, roofcovering, wallcovering, and for laminating plastics, etc.

For the inventive flame-retarded elastic covering material, preference is given to using flame-retarded polymer molding compositions (masterbatches, compounds).

The flame retardant may be incorporated into flame-retarded polymer molding compositions by, for example, premixing all constituents as a powder and/or granule in a mixer, and subsequently homogenizing them in the polymer melt in a compounding unit (for example a twin-screw extruder). The melt is typically drawn off as an extrudate, cooled and granulated. The components may also be introduced separately into the compounding unit directly via a metering system.

It is equally possible to admix the flame-retardant additives with a finished polymer granule or powder, and to process the mixture directly to the elastic covering material.

Flame-Retarded Elastic Covering Material Based on Linoleum

In the case of elastic floorcoverings, the wear layer does not consist of textile fibers, but rather of elastic covering material.

Preference is given to using the inventive flame-retarded elastic covering material based on linoleum as the wear layer.

The proportion of flame retardant in the flame-retarded elastic covering material based on linoleum is preferably up to 40% by weight, more preferably from 0.1 to 20% by weight.

The inventive flame-retarded elastic covering material based on linoleum more preferably contains:
from 10 to 90% by weight of binder based on linoleum
from 10 to 90% by weight of organic fillers
from 1 to 40% by weight of inorganic (mineral) fillers and pigments
from 0.1 to 10% by weight of flame retardants.

The inventive flame-retarded elastic covering material based on linoleum more preferably contains:
from 30 to 70% by weight of binder based on linoleum
from 30 to 70% by weight of organic fillers
from 5 to 35% by weight of inorganic (mineral) fillers and pigments
from 0.1 to 10% by weight of flame retardants.

Apart from the flame retardant, the inventive flame-retarded elastic covering material based on linoleum comprises customary components such as binder (Bedford cement or B cement composed of semioxidized linseed oil (linoxyn) and, at least one resin as a tackifier), at least one filler and optionally at least one colorant.

The binder preferably consists of semioxidized linseed oil and from 1 to 30% by weight of resin (based on linseed oil); the preferred resin is rosin.

Preferred organic fillers are softwood meal (for light types) and/or cork meal (for dark color settings) (in the simultaneous presence of wood meal and cork meal, typically in a weight ratio of 90:10).

The inorganic (mineral) fillers used are preferably calcium carbonate (chalk), kaolin (china clay) and barite.

The linoleum mixture composition typically comprises a colorant such as a pigment (for example titanium dioxide) and/or other customary colorants based on inorganic and organic dyes.

The colorants used may be any natural or synthetic dyes or else organic or inorganic pigments, alone or in any combination.

In addition, the linoleum mixture composition may comprise customary additives such as processing assistants, antioxidants, UV stabilizers, lubricants and the like, which are selected depending on the binder.

The linoleum wear, i.e. upper, layer preferably has a thickness of from 0.9 to 6.0 mm, more preferably from 1.4 to 4 mm. In the context of the present invention, wear layer refers to the uppermost layer, composed of a homogeneous material, of the floorcovering.

The inventive floorcovering based on linoleum may have no backing (cf. DE 199 10 389 A1) or comprise a backing. The backing material used may be a material based on natural or synthetic fibers, woven fabrics, knitted fabrics, mats or textile materials. Examples include jute fabrics, mixed fabrics of natural fibers such as cotton and viscose staple, glass fiber fabrics, glass fiber fabrics coated with adhesive, carbon fibers, polyacrylonitrile fibers, p-aramid fibers (Narmco 5208®, Hexcel F-161®, Kevlar®), polyolefin fibers, PTFE fibers, quartz fibers, alumina fibers, silicon carbide fibers (Nicalon®), mixed fabrics of synthetic fiber, fabrics of core/sheath fibers having, for example, a core of polyester and a sheath of polyamide. Adhesion promoters used for glass fiber fabrics may be, for example, a coating of the glass fibers composed of a styrene-butadiene latex.

The inventive floorcovering may be designed with or without backing, and the linoleum wear layer may either have a single-layer or multilayer configuration. Depending on layer sequence, this may result in either symmetric or asymmetric sheetlike structures, and preference is given to symmetric linoleum sheetlike structures without backing. For example, the inventive floorcovering may comprise two layers of linoleum (materially homogeneous) which may be the same or different.

In addition, a corkment layer with or without backing may be disposed below the linoleum wear layer. Corkment is a mixture which comprises B cement and ground cork as a filler and, in the case of floorcoverings, ensures, as an insulating underlayer, better thermal insulation, tread elasticity and walking comfort, and damps footfall and ambient sound. Such a corkment layer may further comprise one or more of the flame retardants.

In addition, functional layers may also be disposed below or between two linoleum layers, so as to result in triple- or multilayer sheetlike structures. For example, at least one layer, preferably a foam layer, a layer for absorbing footfall sound and/or an insulation layer may be disposed below the wear layer of the inventive floorcovering. The layer thicknesses of the layers applied may be the same or different. All of these functional layers disposed below or between two linoleum layers may likewise each comprise one or more of the aforementioned flame retardants.

In addition, at least one adhesive layer may be disposed on the back of the inventive floorcovering without backing.

The inventive floorcovering based on linoleum may be in the form of sheets or tiles.

The inventive floorcovering based on linoleum may also be produced by customary processes for producing single- or multilayer linoleum floorcoverings with or without backing.

Processes for producing a flame-retarded elastic covering material based on linoleum.

Semioxidized linseed oil is melted at from 130 to 150° C. with 20% by weight of rosin to give linoleum cement. Linoleum cement is mixed with organic, inorganic filler, pigments and flame retardants. This is effected successively in three-roll systems and in mixers of the Werner & Pfleiderer type or Branbury mixers under the action of high shear forces. Afterward, the mixture is granulated using a spiked roll (scraper) and compressed on a backing material at from 10 to 150° C. using a calender. The linoleum sheet is dried at from 60 to 80° C. over from 2 to 3 weeks. Afterward, the sheet is cut to size.

Flame-Retardant Elastic Covering Material Based on Cork

The present invention further relates to a flame-retarded elastic covering material based on cork, which comprises the flame retardant.

Preference is given to using the inventive flame-retardant elastic covering material based on cork as the wear layer of a floorcovering based on cork.

The inventive flame-retarded elastic covering material based on cork more preferably contains:
from 10 to 90% by weight of organic binder
from 10 to 90% by weight of organic fillers
from 0.1 to 10% by weight of flame retardants.

A preferred organic binder is melamine-formaldehyde resin.

A preferred organic filler is cork granule having a granule size of from 0.1 to 10 mm.

Process for Producing a Flame-Retarded Elastic Covering Material Based on Cork

In the process, binder and cork granule are mixed with a crosslinking catalyst and compressed at elevated temperature and elevated pressure, and the resulting blocks are cut into slabs. Their surface is ground and optionally protected with a surface layer. Afterward, the slabs are cut to size.

Flame-Retarded Elastic Covering Material Based on Thermoplastics

Inventive elastic covering material based on thermoplastics may contain polyvinyl chloride, acrylonitrile-butadiene-styrene, polypropylene, polyethylene and thermoplastic polyurethane. Other thermoplastic resins may be plasticized and include polyvinyl acetate, cellulose acetate, polystyrene, ethylcellulose, polyvinylidene chloride, polyurethane, nylon, acrylic and polyphenylene oxide.

Preference is given to using the flame-retardant elastic covering material based on thermoplastics as a wear layer in a floorcovering.

Flame-Retarded Elastic Covering Material Based on Plasticized PVC

The flame-retarded elastic covering material based on plasticized PVC preferably contains:
from 10 to 90% by weight of polyvinyl chloride
from 10 to 90% by weight of plasticizer
from 10 to 90% by weight of inorganic (mineral) fillers
from 0.1 to 10% by weight of inventive flame retardant.

Preferred plasticizers include: butyl cyclohexyl phthalate, tri(butoxyethyl) phosphate, trioctyl phosphate, 2-ethylhexyl diphenyl phosphate, dibutyl phthalate, diisobutyl adipate, epoxidized di(2-ethylhexyl)tetrahydrophthalate, di(2-ethylhexyl)phthalate, diisooctyl phthalate, dioctyl adipate, diisononyl phthalate, di(2-ethylhexyl) hexahydrophthalate, n-octyl phthalate, n-decyl phthalate, tricresyl phosphate, butyl benzyl phthalate, dicapryl phthalate, di(3,5,5-trimethylhexyl)phthalate, diisodecyl phthalate, di(2-ethylhexyl)adipate, butylepoxy stearate, epoxidized soy oil, epoxidized octyl tallate, dimethyl phthalate, hexylepoxy stearate, cresyl diphenyl phosphate, di(2-ethylhexyl)isophthalate, n-octyl adipate, n-decyl adipate, di(2-ethylhexyl)azelate, epoxidized octyl oleate, di(2-ethylhexyl) sebacate, tetraethylene glycol di(2-ethylhexoate), diisodecyl adipate and triethylene glycol di(2-ethylhexoate).

Inventive inorganic (mineral) fillers are calcium carbonate (natural, surface-treated or precipitated limestone), hydrated magnesium silicate, barium sulfate, aluminum silicate, magnesium hydroxide, diatomaceous earth, hydrated calcium silicate, silicon dioxide and calcium sulfate.

Preferred stabilizers are fatty acid metal salts of barium, cadmium, calcium, zinc.

Preferred lubricants are waxes, fatty acid esters, calcium stearate.

Preference is given to using the flame-retarded elastic covering material based on plasticized PVC as the wear layer in a floorcovering. This features high wear resistance, good elasticity and simple cleaning.

Process for Producing a Flame-Retarded Elastic Covering Material Based on Plasticized PVC The ingredients are mixed, rolled to give sheets and comminuted. The resulting granule having preferred particle size of from 0.1 to 10 mm is melted at from 100 to 300° C. and rolled onto a support layer in a roller and cut to size.

Flame-retarded elastic covering material based on unvulcanized and vulcanized rubber A flame-retarded elastic covering material based on unvulcanized and vulcanized rubber more preferably contains:

from 10 to 90% by weight of unvulcanized rubber (for example styrene-butadiene rubber)
from 10 to 90% by weight of inorganic (mineral) fillers
from 0.1 to 10% by weight of flame retardants.

Preference is given to using the inventive flame-retardant elastic covering material based on unvulcanized and vulcanized rubber as a floorcovering. Such elastic vulcanized rubber coverings feature high resistance capacity against mechanical and chemical (acids, oils, fats, lit cigarettes) action.

Suitable unvulcanized rubbers for the inventive covering material include not only natural rubber but also synthetic rubbers: polybutadiene, butadiene-$C_1$-$C_4$-alkyl acrylate copolymers, polychloroprene, polyisoprene, styrene-butadiene copolymers, butadiene-acrylonitrile copolymers.

For the inventive covering material, it is possible to add to the unvulcanized rubber crude mixtures customary fillers and assistants, for example plasticizers, resins, factices and stabilizers for achieving certain crude mixture or vulcanization properties.

Process for producing a covering material based on unvulcanized and vulcanized rubber According to the invention, unvulcanized rubber, fillers, flame retardants are mixed at from 100 to 300° C. The vulcanization is effected at from 100 to 300° C., preferably from 100 to 200° C., more preferably from 130 to 180° C. The vulcanization preferably takes place under a pressure of from 10 to 200 bar. Preference is given to generating the pressure using rolls.

Preferred mixing units are the kneaders customary in the rubber industry, rolls, internal mixers and mixing extruders, which generally work at shear rates of from 1 to 1000 sec, preferably from 1 to 200 sec.

The composition temperature, needed for the process according to the invention, of the mixture of preferably from 140 to 250° C., especially from 150 to 200° C., may be achieved by supplying heat from outside or by appropriate friction in the course of mixing.

For vulcanization, the crosslinking systems known from rubber technology, such as disulfides, sulfur, peroxides, poly-isocyanates, metal oxides, phenol resins and combinations thereof, may be used. Particular preference is given to sulfur crosslinking systems.

The crosslinking systems are preferably mixed in at temperatures below 130° C., more preferably below 100° C.

Flame-Retarded Elastic Covering Material for Backings of Textile Floorcoverings

The wear layer of textile floorcoverings is composed of fibers of polyamide, polyacrylic, polypropylene, wool, viscose staple. The backing serves to improve the surface stability, the absorptive action and to improve the processing and the layflat performance. It is composed of foamed and unfoamed polymer compositions or of textile sheetlike structures which consist of butadiene-styrene dispersions, PVC plastisols, polyurethane mixtures, natural latex, bitumen, polyethylene, polypropylene, polyisobutylene, copolymers and mixtures thereof.

The backing layer may consist of pure or mixed polymer and also comprise fillers. Inorganic (mineral) fillers may be used in fibrous, flocculated, crystalline, amorphous, hollow, pulverulent or particulate form. Examples of fillers include: calcium carbonate, calcium sulfate, magnesium oxide, magnesium hydroxide, perlite, synthetic mica, vermiculite, clay minerals, thermally stable carbon fibers, zinc oxide, dawsonite, hollow calcium carbonate spheres of low bulk density, hollow glass spheres, thermally stable hollow carbon spheres, aluminum hydroxide, recycled fly ash.

A flame-retarded elastic covering material for backings of textile floorcoverings more preferably contains:

from 10 to 90% by weight of polymer composition
from 10 to 90% by weight of inorganic (mineral) fillers
from 0.1 to 10% by weight of flame retardants.

Process for producing a flame-retarded elastic covering material for backings of textile floorcoverings Latex, fillers and flame retardants are mixed. The latex mixture is cast onto the carpet backing and a further top layer is optionally applied. The carpet is dried at from 50 to 200° C. and cut to size.

Experimental

The following inventive organophosphorus flame retardants were used:

Exolit OP 1230® (Clariant GmbH) contains 200 ppm of electrolyte (calculated as sulfate). The particle size $d_{90}$ was 100 μm.

Exolit OP 930® (Clariant GmbH) contains 250 ppm of electrolyte (calculated as sulfate). The particle size $d_{90}$ was 5 μm. Exolit OP 1311®

(Clariant GmbH) contains 600 ppm of electrolyte (calculated as sulfate).

The expandable graphite used, Nordmin 250®, contains 8% electrolyte (calculated as $H_2SO_4$).

The whiteness of the flame retardant is determined according to Hunter (see table 1). It is substantially higher than that of expandable graphite (prior art). A negative Hunter a value indicates green coloration, a positive Hunter a value red coloration. A negative Hunter b value indicates blue coloration, a positive value yellow coloration.

The test method to EN ISO 9239-1 and EN ISO 11925-2 is based on the old DIN 4102 T14 test, but the classification is according to EN 13501-1. Floorcoverings having a test result of a critical radiation intensity of >4.5 kW/m² are classified in $C_{FL}$. In the case of a critical radiation intensity of >8 kW/m², they are classified into the $B_{FL}$ building materials class.

EXAMPLES 1 to 7

Linoleum

To this end, in accordance with PCT/WO 02/081812, all of the components, listed in table 2 below, for the linoleum composition are mixed in a kneader to give a substantially homogeneous basic composition (mixing composition). The thus obtained mixing composition is processed through a roll mill to give rolled sheets and fed to a scraper, after which the resulting mixing composition particles are fed to a calender and compressed onto jute as a backing material under pressure and a temperature of typically from 80 to 110° C. The belt speed is 10 m/min.

The inventive flame-retarded coverings of example 1 to 4 achieve the $B_{Fl}$ fire protection classification. The covering produced in comparative experiments 5 to 7 only achieves the $C_{Fl}$ fire protection classification.

EXAMPLE 8

Cork Floorcovering

To produce an inventive cork floorcovering, cork granule of a certain particle size distribution and residual moisture content (preferably 1.5-3.0%) is typically mixed with melamine-formaldehyde resin as a binder and also the flame retardant and a conventional crosslinking catalyst. The amounts used can be taken from table 2. This mixture is introduced into thick-walled steel molds (exemplary composition: width 700 mm, length 1000 mm, height 800 mm) and compressed (preferably 10-200 t).

The crosslinking is effected, for example, at 110-135° C. within from 8 to 22 hours. The blocks thus manufactured from cork granule (having, for example, a residual height of 100-300 mm depending on degree of compaction/pressure) are then cut/sliced into individual slabs by means of a belt-cutting unit. The slab thickness may be, for example, between 1 and 10 mm. In order to achieve a smooth surface having sharp contours, the slabs are typically sanded by means of a belt-sanding machine and calibrated. The upper side is sanded preferably with from 3 to 6 sanding operations, initially with coarse abrasive grain and finally with fine abrasive grain (for example, 1st=grain size 40, 2nd=grain size 80, 3rd=grain size 120, 4th=grain size 180, 5th=grain size 220, 6th=grain size 360). The underside is sanded only with 1-2 sanding passes, for example with size 24 and size 40 grain. The slabs may subsequently be provided with surface protection. This may be effected, for example, with a clear PVC film (K value 60 or 80), a coating (from PPG or Lott) or wax (wax type, for example: solid floor wax, from Loba, Ditzingen Germany).

Tile-shaped slabs may subsequently be stamped out of the coated slabs and the edges optionally made cleaner by means of cutting blades.

The inventive flame-retarded covering achieves the $B_{Fl}$ fire protection classification.

EXAMPLES 9-10

PVC

The ingredients are mixed in the amounts stated in table 2 and then rolled on a 2-roll calender to give sheets having the desired thickness and these are comminuted. The granule is melted at 200° C. and rolled onto a support layer using a 2-roll system and cut to size.

The inventive flame-retarded coverings of example 9 and 10 achieve the $B_{Fl}$ fire protection classification.

EXAMPLE 11

Vulcanized Rubber

A measuring kneader from Haake Mess-Technik GmbH & Co, Karlsruhe 41 is used to mix the components specified in table 3 at a batch temperature of 170° C. and at rotation rates of the CAM paddles of from 30 to 100 rpm for 6 min. The disulfide vulcanizing system was subsequently mixed in afterward on a laboratory roll system at from 40 to 60° C. Vulcanization was effected at 150° C. for 20 minutes.

The inventive flame-retarded covering achieved the $B_{Fl}$ fire protection classification.

Percentages are typically % by weight.

EXAMPLES 12 to 13

Latex

The polyurethane latex is initially charged with stirring and the calcium carbonate filler is added at just the rate at which it is dispersed in the liquid. Paragum® 241 thickener (Para-Chem Southern, Inc.) is added until a viscosity of 9300 cPs has been attained. The carpet for test purposes is nylon loop pile of weight 750 g/m². The latex mixture is cast onto the carpet backing up to a layer weight of 1.18 kg/m squared, followed by a polypropylene top layer of 110 g/m² as a second backing layer. The carpet is dried at 132° C. for 12 min.

The inventive flame-retarded covering achieves the $B_{Fl}$ fire protection classification.

TABLE 1

Whitenesses of selected flame retardants

| | L value | a value | b value |
|---|---|---|---|
| | | (according to Hunter) | |
| Inventive flame retardant | 92 | 0.36 | 0.59 |
| Nordmin 250 (R) expandable graphite | 42.43 | 0.58 | −0.02 |

TABLE 2

| | Examples | | | | | | | | | |
|---|---|---|---|---|---|---|---|---|---|---|
| | 1 % | 2 % | 3 % | 4 % | 5 % | 6 % | 7 % | 8 % | 9 % | 10 % |
| Cement | 40 | 40 | 40 | 40 | 40 | 40 | 40 | | | |
| Cork meal | 3 | 3 | 3 | 3 | 3 | 3 | 3 | | | |
| Wood meal | 27 | 27 | 27 | 27 | 27 | 27 | 27 | | | |
| Chalk | 26.7 | 17 | 20 | 20 | 27 | 27 | 27 | 25 | | 5 |
| Titanium dioxide | 3 | 3 | 3 | 3 | 3 | 3 | 3 | 2 | | |
| Melamine | | | | | | | | 36 | | |
| Formaldehyde | | | | | | | | 49 | | |
| Ammonium chloride | | | | | | | | 2 | | |
| Ethoxylate-based wetting agent | | | | | | | | 2 | | |
| PVC | | | | | | | | | 39 | 57 |
| Di(2-ethylhexyl) phthalate | | | | | | | | | 9 | 11 |
| Diisononyl phthalate | | | | | | | | | 12 | 12 |
| Dioctyl adipate | | | | | | | | | | 2 |
| Stabilizer | | | | | | | | | 1.6 | 1 |

TABLE 2-continued

| | Examples | | | | | | | | | |
|---|---|---|---|---|---|---|---|---|---|---|
| | 1 % | 2 % | 3 % | 4 % | 5 % | 6 % | 7 % | 8 % | 9 % | 10 % |
| Lubricant | | | | | | | | | 0.4 | 2 |
| Exolit OP 1230 (R) | 0.3 | 10 | | | | | | 10 | 10 | 10 |
| Exolit OP 1311 (R) | | | 10 | | | | | | | |
| Exolit OP 930 (R) | | | | 10 | | | | | | |
| NordMin 250 (R) | | | | | 5 | | | | | |
| NordMin KP 251 | | | | | | 5 | | | | |
| ATH M20B (R) | | | | | | | 10 | | | |
| Budit 3076 DC (R) | | | | | | | 10 | | | |
| Fire protection classification to DIN 4102 T14, EN 13501-1 | $B_{FI}$ | $B_{FI}$ | $B_{FI}$ | $B_{FI}$ | $C_{FI}$ | $C_{FI}$ | $C_{FI}$ | $B_{FI}$ | $B_{FI}$ | $B_{FI}$ |

TABLE 3

| | Examples 11 % |
|---|---|
| Styrene-butadiene rubber having 23% styrene content | 31 |
| Styrene-butadiene copolymer having 85% styrene content | 6 |
| Precipitated silica | 12 |
| Kaolin | 22 |
| Precipitated chalk | 9 |
| Coumarone-indene resin | 5 |
| Zinc oxide | 2 |
| Stearic acid | 0.5 |
| Sulfur | 1 |
| Polyethylene glycol | 1 |
| Cyclohexylbenzothiazyl sulfenamide | 1 |
| Tetramethylthiuramine disulfide | 0.2 |
| Exolit OP 930 (R) | 10 |
| Fire protection classification to DIN 4102 T14, EN 13501-1 | $B_{FI}$ |

TABLE 4

| | Examples | |
|---|---|---|
| | 12 % | 13 % |
| Polyurethane latex (56%) | 30 | — |
| Styrene-butadiene latex (53.3%) | — | 30 |
| Calcium carbonate | 60 | 60 |
| Exolit OP 1230 (R) | 10 | 10 |
| Fire protection classification to DIN 4102 T14, EN 13501-1 | | $B_{FI}$ |

The invention claimed is:

1. An elastic covering material, comprising a covering materials, an organic binder, and as a flame retardant, a phosphinate salt of the formula (I) a diphosphinate salt of the formula (II) a polymer of the phosphinate salt, a polymer of the diphosphinate salt or a mixture thereof

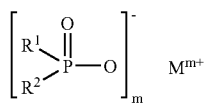

(I)

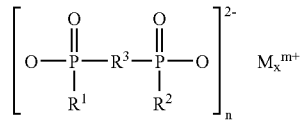

(II)

where
R$^1$, R$^2$ are the same or different and are each C$_1$-C$_6$-alkyl, linear or branched, or aryl;
R$^3$ is C$_1$-C10-alkylene, linear or branched, C$_6$-C$_{10}$-arylene, -alkylarylene or -arylalkylene;
M is Mg, Ca, Al, Sb, Sn, Ge, Ti, Zn, Fe, Zr, Ce, Bi, Sr, Mn, Li, Na, K or a protonated nitrogen base;
m is from 1 to 4;
n is from 1 to 4;
x is from 1 to 4
and wherein
the covering material is a thermoplastic resin, polyvinyl chloride, vulcanized rubber, or polymers based on polyurethane or styrene-butadiene latex;
wherein
the organic binder is a melamine-formaldehyde resin, wherein
the elastic covering material comprises the flame retardant in amounts of from 0.01 to 40% by weight, based on the total weight of the elastic covering material
and wherein
the elastic covering material is a floorcovering, roofcovering or wallcovering.

2. The elastic covering material as claimed in claim 1, wherein M is calcium, aluminum or zinc.

3. The elastic covering material as claimed in claim 1, wherein R$^1$, R$^2$ are the same or different and are C$_1$-C$_6$-alkyl, linear or branched, or phenyl.

4. The elastic covering material as claimed in claim 1, wherein R$^1$, R$^2$ are the same or different and are methyl, ethyl, n-propyl, isopropyl, n-butyl, tert-butyl, n-pentyl or phenyl.

5. The elastic covering material as claimed in claim 1, wherein R$^3$ is methylene, ethylene, n-propylene, isopropylene, n-butylene, tert-butylene, n-pentylene, n-octylene or n-dodecylene.

6. The elastic covering material as claimed in claim 1, wherein R$^3$ is phenylene, naphthylene, methylphenylene, ethylphenylene, tert-b utyfphenylene, methylnaphthylene, ethylnaphthylene, tert-butylnaphthylene, phenylmethylene, phenylethylene, phenyipropylene or phenylbutylene.

7. The elastic covering material as claimed in claim 1, further comprising at least one compound selected from the group consisting of melamine phosphate, dimelamine phosphate, melamine pyrophosphate, melamine polyphosphates, melam polyphosphates, melem polyphosphates, melon polyphosphates melamine condensates and carbodjimides.

8. The elastic covering material as claimed in claim 1, further comprising at least one compound selected from the group consisting of oligomeric esters of tris(hydroxyethyl) isocyanurate with aromatic polycarboxylic acids, benzog uanam me, tris(hyd roxyethyl) isocya n urate, allantoin, g lycouril, melamine, melamine cyanurate, dicyandiamide and guanidine.

9. The elastic covering material as claimed in claim 1, further comprising at least one nitrogen-containing phosphate of the formulae (NH$_4$)$_y$H$_{3-y}$ PO$_4$ or (NH$_4$ PO$_3$)$_z$, where y is from 1 to 3 and z is from 1 to 10 000.

10. The elastic covering material as claimed in claim 1, further comprising at feast one compound selected from the group consisting of salts and esters of orthosilicic acid and condensates thereof, silicates, zeolites and silicas, glass powder, glass-ceramic powder, ceramic powder, magnesium hydroxide, hydrotalcite, magnesium carbonates, magnesium calcium carbonates, zinc oxide, zinc stannate, zinc hydroxystannate, zinc phosphate, zinc borate, zinc sulfide, aluminum hydroxide and aluminum phosphate.

11. The elastic covering materiai as claimed in claim 1, further comprising at least one nitrogen compound of the formulae (III) to (VIII)

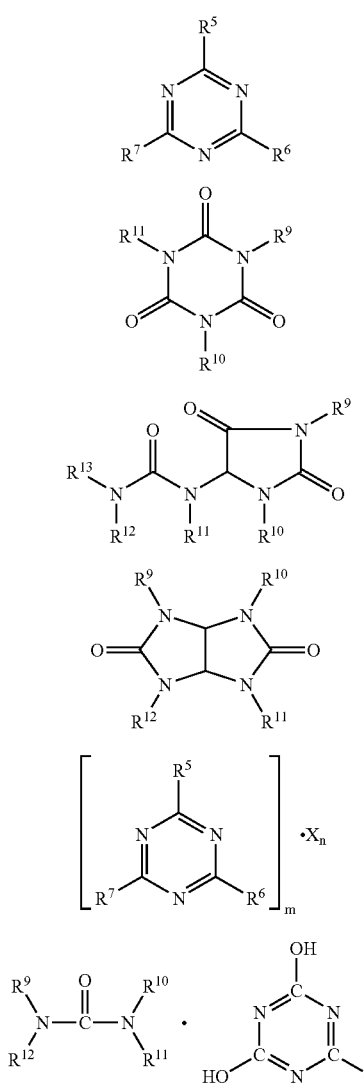

where
R$^5$ to R$^7$ are hydrogen, C$_1$-C$_8$-alkyl, C$_5$-C$_{16}$-cycloalkyl or -alkylcycloalkyl, optionally substituted by a hydroxyl or a C$_1$-C$_4$-hydroxyalkyl function, C$_2$-C$_8$-alkenyl, C$_1$-C$_8$-alkoxy, -acyl, -acyloxy, C$_6$-C$_{12}$-aryl or -arylalkyl, -OR$^8$ or -N(R$^8$)R$^9$, either N-alicyclic or N-aromatic, R hu 8is hydrogen, C$_1$-C$_8$-alkyl, C$_5$-C$_{16}$-cycloalkyl or -alkylcycloalkyl, optionally substituted by a hydroxyl or a C$_1$-C$_4$-hydroxyalkyl function, C$_2$-C$_8$-alkenyl, C$_1$-C$_8$-alkoxy, -acyl, -acyloxy, or C$_6$-C$_{12}$-aryl or -arylalkyl, R$^9$ R$^{13}$ are the same groups as R$^8$ or —O-R$^8$, m and n are each independently 1, 2, 3 or 4, X are acids which form adducts with triazine compounds (III).

12. The elastic covering material as claimed in claim 1, wherein the flame retardant is present from 0.1 to 20% by weight, based on the total weight of the elastic covering material.

13. The elastic covering material as claimed in claim 1, wherein the flame retardant is present from 0.3 to 10% by weight, based on the total weight of the elastic covering material.

14. The elastic covering material as claimed in claim 1, wherein the thermoplastic resin is polyvinyl chloride, acrylonitrile-butadiene-styrene, polypropylene, polyethylene, thermoplastic polyurethane, polyvinyl acetate, cellulose acetate, polystyrene, ethylcellulose, polyvinylidene chloride, polyurethane, nylon, acrylic, polyacrylate or polyphenylene oxide.

15. The elastic covering material as claimed in claim 1, wherein the thermoplastic resin of the covering material is polyvinyl chloride, and the covering material contains from 10 to 90% by weight of the polyvinyl chloride, 10 to 90% by weight of plasticizer, 10 to 90% by weight of at least one inorganic mineral fillers and 0.1 to 10% by weight of the flame retardant.

16. The elastic covering material as claimed claim 1, wherein the covering material is vulcanized rubber, and the covering material contains from 10 to 90% by weight of vulcanized rubber, 10 to 90% by weight of at least one inorganic filler and 0.1 to 10% by weight of the flame retardant.

17. The elastic covering material as claimed in claim 1, comprising
from 10 to 90% by weight of polymer composition
from 10 to 90% by weight of at least one inorganic mineral filler, and
from 0.1 to 10% by weight of the flame retardant.

18. A process for producing an elastic covering material using linoleum, comprising the steps of melting semioxidized linseed oil with rosin at from 30 to 300° C. for a period of from 0.01 to 100 h to give linoleum cement, mixing the linoleum cement with at least one compound selected from the group consisting of an organic and inorganic filler, at least one pigment and at least one flame retardant to form a mixture, granulating the mixture using a spiked roll, compressing the mixture on a backing material using a calender at from 10 to 150° C. and drying the backing material at from 30 to 300° C. over for a period of from 1 to 1000 h, wherein the flame retardant includes a phosphinate salt of the formula (I) a diphosphinate salt of the formula (II) a polymer of the phosphinate salt, a polymer of the diphosphinate salt and mixtures thereof

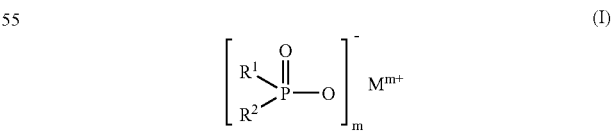

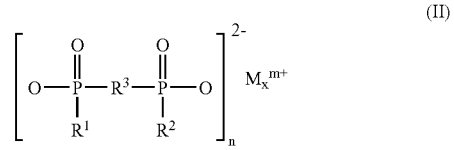

where $R^1$, $R^2$ are the same or different and are each $C_1$-$C_6$-alkyl, linear or branched, or aryl; $R^3$ is $C_1$-$C_{10}$-alkylene, linear or branched, $C_6$-$C_{10}$-arylene, -alkylarylene or -arylalkylene;

M is Mg, Ca, Al, Sb, Sn, Ge, Ti, Zn, Fe, Zr, Ce, Bi, Sr, Mn, Li, Na, K or a protonated nitrogen base;

m is from 1 to 4;

n is from 1 to 4;

x is from 1 to 4.

19. A process for producing an elastic covering material as claimed in claim 15, comprising the steps of mixing the polyvinyl chloride, the plasticizer, the at least one inorganic mineral filler and the at least one flame retardant, and optionally at least one additive to form a mixture, rolling the mixture to form a sheet and comminuting the sheet to form granules having a particle size of from 0.1 to 10 mm, melting the granules at from 100 to 300° C., rolling the melted granules onto a support sheet and cutting the support sheet to size.

20. A process for producing an elastic covering material comprising the steps of mixing unvulcanized rubber, at least one filler, at least flame retardant and optionally, at least one further additive at a temperature from 100 to 300° C. for a period of from 001 to 100 h to form a mixture and vulcanizing the mixture, wherein the flame retardant includes a phosphinate salt of the formula (I) a diphosphinate salt of the formula (II) a polymer of the phosphinate salt, a polymer of the diphosphinate salt and mixtures thereof

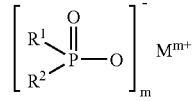

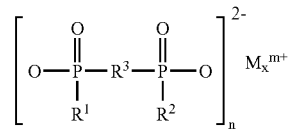

where $R^1$,$R^2$ are the same or different and are each C1-C6-alkyl, linear or branched, or aryl; $R^3$ is $C_1$-$C_{10}$-alkylene, linear or branched, $C_6$-$C_{10}$-arylene, -alkylarylene or -arylalkylene;

M is Mg, Ca, Al, Sb, Sn, Ge, Ti, Zn, Fe, Zr, Ce, Bi, Sr, Mn, Li, Na, K or a protonated nitrogen base;

m is from 1 to 4;

n is from 1 to 4;

x is from 1 to 4.

21. A process for producing an elastic covering material comprising the steps of mixing an organic binder, cork granules having a particle size of from 0.1 to 10 mm with a crosslinking catalyst to form a mixture, adding a flame retardant to the mixture, compressing the mixture at a temperature of from 30 to 300° C. for a period of from 0.01 to 100 hours at an elevated pressure of 1 - 200° t to form a block, and cutting the block into at least one slab, wherein the flame retardant includes a phosphinate salt of the formula (I) a diphosphinate salt of the formula (II) a polymer of the phosphinate salt, a polymer of the diphosphinate salt and mixtures thereof

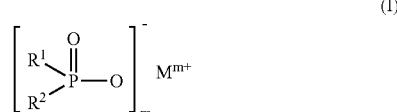

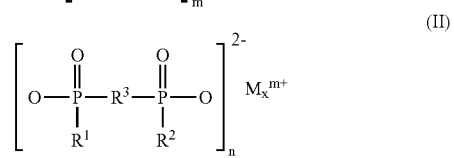

where $R^1$, $R^2$ are the same or different and are each $C_1$-$C_6$-alkyl, linear or branched, or aryl;

$R^3$ is $C_1$-$C_{10}$-alkylene, linear or branched, $C_6$-$C_{10}$-arylene, -alkylarylene or -arylalkylene;

M is Mg, Ca, Al, Sb, Sn, Ge, Ti, Zn, Fe, Zr, Ce, Bi, Sr. Mn, Li, Na, K or a protonated nitrogen base;

m is from 1 to 4;

n is from 1 to 4; and x is from 1 to 4.

22. A process for producing an elastic covering material comprising the steps of mixing. latex, at least one inorganic mineral filler and a flame retardant at a temperature of from 20 to 300° C. to form a latex mixture, casting the resulting latex mixture on a carpet backing, and optionally, applying a further top layer of latex mixture, wherein the flame retardant includes a phosphinate salt of the formula (I) a diphosphinate salt of the formula (II) a polymer of the phosphinate salt, a polymer of the diphosphinate salt and mixtures thereof

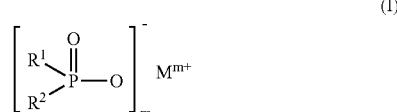

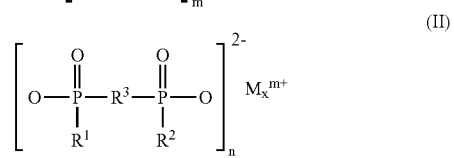

where $R^1$, $R^2$ are the same or different and are each $C_1$-$C_6$-alkyl, linear or branched, or aryl;

$R^3$ is $C_1$-$C_{10}$-alkylene, linear or branched, $C_6$-$C_{10}$-arylene, -alkylarylene or -arylalkylene;

M is Mg, Ca, Al, Sb, Sn, Ge, Ti, Zn, Fe, Zr, Ce, Bi, Sr, Mn, Li, Na, K or a protonated nitrogen base;

m is from 1 to 4;

n is from 1 to 4; and x is from 1 to 4.

23. A process for producing an elastic covering material, comprising the steps of mixing 10 to 90% by weight of polyvinyl chloride, 10 to 90% by weight of plasticizer, 10 to 90% by weight of at least one inorganic mineral filler and 0.1 to 10% by weight of a flame retardant, and optionally at least one additive to form a mixture, rolling the mixture to form a sheet and comminuting the sheet to form granules having a particle size of from 0.1 to 10 mm, melting the granules at from 100 to 300° C., rolling the melted granules onto a support sheet and cuffing the support sheet to size, wherein the flame retardant includes a phosphinate salt of the formula (I) a diphosphinate salt of the formula (II) a polymer of the phosphinate salt, a polymer of the diphosphinate salt or a mixture thereof

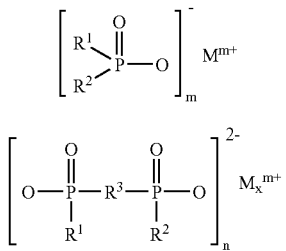

where
R$^1$, R$^2$ are the same or different and are each C$_1$-C$_6$-alkyl, linear or branched, or aryl;
R$^3$ is C$_1$-C$_{10}$-alkylene, linear or branched, C$_6$-C$_{10}$-arylene, -alkylarylene or -arylalkylene;
M is Mg, Ca, Al, Sb, Sn, Ge, Ti, Zn, Fe, Zr, Ce, Bi, Sr, Mn, Li, Na, K or a protonated nitrogen base;
m is from 1 to 4;
n is from 1 to 4; and
x is from 1 to 4.

24. An elastic covering material made in accordance with the process of claim 23.

* * * * *